(12) United States Patent
Vigderman et al.

(10) Patent No.: US 8,956,440 B2
(45) Date of Patent: Feb. 17, 2015

(54) HIGH-YIELD SYNTHESIS OF GOLD NANORODS WITH OPTICAL ABSORPTION AT WAVELENGTHS GREATER THAN 1000NM USING HYDROQUINONE

(75) Inventors: Leonid Vigderman, Aurora, CO (US); Eugene R. Zubarev, Houston, TX (US)

(73) Assignee: William Marsh Rice University, Houston, TX (US)

( * ) Notice: Subject to any disclaimer, the term of this patent is extended or adjusted under 35 U.S.C. 154(b) by 427 days.

(21) Appl. No.: 13/420,880

(22) Filed: Mar. 15, 2012

(65) Prior Publication Data
US 2012/0235095 A1 Sep. 20, 2012

Related U.S. Application Data (60) Provisional application No. 61/454,254, filed on Mar. 18, 2011.

(51) Int. Cl.
| | | |
|---|---|---|
| *B22F 9/24* | (2006.01) | |
| *B82Y 40/00* | (2011.01) | |
| *G02B 5/20* | (2006.01) | |
| *B82Y 20/00* | (2011.01) | |
| *B82Y 30/00* | (2011.01) | |
| *B22F 1/00* | (2006.01) | |

(52) U.S. Cl.
CPC .............. *G02B 5/208* (2013.01); *B82Y 20/00* (2013.01); *B82Y 30/00* (2013.01); *B82Y 40/00* (2013.01); *B22F 1/0018* (2013.01); *B22F 1/0062* (2013.01); *B22F 9/24* (2013.01); *G02B 2207/101* (2013.01); *B22F 1/0025* (2013.01); *B22F 2001/0037* (2013.01); *B22F 2301/255* (2013.01); *B22F 2304/054* (2013.01); *Y10S 977/896* (2013.01)
USPC .............................. 75/370; 75/722; 977/896

(58) Field of Classification Search
None
See application file for complete search history.

(56) References Cited

U.S. PATENT DOCUMENTS

| | | | |
|---|---|---|---|
| 8,129,199 B2 | 3/2012 | Murphy | |
| 2007/0116773 A1* | 5/2007 | Frederix et al. | 424/489 |
| 2008/0266555 A1* | 10/2008 | Murphy et al. | 356/301 |
| 2011/0162870 A1* | 7/2011 | Markovich et al. | 174/126.1 |
| 2013/0295563 A1* | 11/2013 | Nam et al. | 435/6.11 |

* cited by examiner

*Primary Examiner* — George Wyszomierski
(74) *Attorney, Agent, or Firm* — McKee, Voorhees & Sease (57) ABSTRACT

The present invention provides improved methods for preparing cetyltrimethylammonium bromide-capped gold nanoparticles through the use of hydroquinone as a reducing agent. Such methods generally comprise the steps of: (1) providing a seed solution comprising a gold nanoparticle; (2) providing an aqueous growth solution comprising: (i) cetyltrimethylammonium bromide, (ii) hydrogen tetrachloroaurate, and (iii) hydroquinone; and (3) adding a quantity of the seed solution to the aqueous growth solution.

9 Claims, 5 Drawing Sheets

HIGH-YIELD SYNTHESIS OF GOLD NANORODS WITH OPTICAL ABSORPTION AT WAVELENGTHS GREATER THAN 1000NM USING HYDROQUINONE

CROSS-REFERENCE TO RELATED APPLICATIONS

This application claims priority under 35 U.S.C. §119 to provisional application Ser. No. 61/454,254 filed Mar. 18, 2011, herein incorporated by reference in its entirety.

GRANT REFERENCE

This invention was made with government support under Grant No. NSF0547399, awarded by National Science Foundation. The government has certain rights in the invention.

BACKGROUND OF THE INVENTION

Bulk solution synthetic methods often produce nanocrystals of multiple sizes and shapes, and hence there is relatively low yield of the desired size and shape. Murphy, C. J. *Science* 2002, 298, 2139-2141. Although colloid chemists have achieved excellent control over particle size for several metallic and semiconductor systems, there has been limited success in gaining control over the shape of the nanocrystals. Schmid, G.; Ed. *Clusters and Colloids. From Theory to Applications*; VCH: New York, 1994. Watzky, M. A.; Finke, R. G., *J. Am. Chem. Soc.* 1997, 119, 10382-10400. Jana, N. R.; Peng, X., *J. Am. Chem. Soc.* 2003, 125, 14280-14281. Controlling size, shape, and structural architecture of the nanocrystals requires manipulation of the kinetic and thermodynamic parameters of the systems via utilization of various additives, light and thermal energies, and their various combinations. Ahmadi, T. S.; Wang, Z. L.; Green, T. C.; Henglein, A.; El-Sayed, M. A., *Science* 1996, 272, 1924-1925. Pileni, M. P.; Ninham, B. W.; Gulik-Krzywicki, T.; Tanori, J.; Lisiecki, I.; Filankembo, A., *Adv. Mater.* 1999, 11, 1358-1362. Li, M.; Schnablegger, H.; Mann, S, *Nature* 1999, 402, 393-395. Jin, R.; Cao, Y. C.; Hao, E.; Metraux, G. S.; Schatz, G. C.; Mirkin, C. A., *Nature* 2003, 425, 487-490. Sun, Y.; Xia, Y. *Science* 2002, 298, 2176-2179. Sun, Y.; Xia, Y., *Adv. Mater.* 2002, 14, 833-837. Sun, Y.; Mayers, B.; Herricks, T.; Xia, Y. *Nano Lett.* 2003, 3, 955-960.

Therefore, there remains a need for methods and compositions that overcome these deficiencies and that effectively provide shaped nanoparticles in high yields, and for gold nanoparticles without waste of the expensive gold.

Surface enhanced Raman spectroscopy (SERS) is a powerful analytical tool for determining chemical information for molecules on metallic substrates. Moskovits, M. *Rev. Mod. Phys.* 1985, 57, 783-826. In general, there are two traditional operational mechanism to describe the overall SERS effect, electromagnetic (EM) and chemical (CHEM) enhancement mechanisms. EM enhancement is enhancement of the local electromagnetic field incident on an adsorbed molecule at a metallic surface. CHEM enhancement results from electronic resonance/charge transfer between a molecule and a metal surface, which leads to an increase the polarizability of the molecule. Otto, A.; Mrozek, I.; Pettenkofer, C. *Surf. Sci.* 1990, 238, 192. Schultz, S. G.; Janik-Czachor, M.; Van Duyne, R. P. *Surf. Sci.* 1984, 104, 419. Since the introduction of the SERS phenomenon on roughened silver electrodes, much attention has turned to SERS on spherical colloidal substrates of either gold or silver. Jeanmaire, D. L.; Van Duyne, R. P., *J. Electroanal. Chem.* 1977, 84, 1-20. Albrecht, M. G.; Creighton, J. A. *J. Am. Chem. Soc.* 1977, 99, 5215-5217. Nie, S. M.; Emery, S. R. *Science* 1997, 275, 1102-1106. Krug, J. T.; Wang, G. D.; Emory, S. R.; Nie, S. M., *J. Am. Chem. Soc.*, 1999, 121, 9208-9214. Freeman, R. G.; Bright, R. M.; Hommer, M. B.; Natan, M. J., *J. Raman Spectrosc.* 1999, 30, 733-738. Jensen, T. R.; Malinsky, M. D.; Haynes, C. L.; Van Duyne, R. P., *J. Phys. Chem. B* 2000, 104, 10549-10556. Kneipp, K.; Kneipp, H.; Deinum, G.; Itzkan, I.; Dasari, R. R.; Feld, M. *S. Appl. Spectrosc.* 1998, 52, 175-178. Colloidal nanoparticles are of interest as SERS substrates not only because they are strong light scatterers, but because of their tunable optical properties which depend on nanoparticle size, shape, and aggregation state. El-Sayed, M. A., *Acc. Chem. Res.* 2001, 34, 257-264. Kelly, K. L.; Coronado, E.; Zhao, L. L.; Schatz, G. C. *J. Phzys. Chem. B* 2003, 107, 668-677.

Spheroidal or rod-shaped nanoparticles are of significant interest as SERS substrates because of their tunable longitudinal plasmon bands and the "lightning rod" effect on surface enhancement. Schatz, G. C., *Acc. Chem. Res.* 1984, 17, 370-376. Gersten, J. I., *J. Chem. Phys.* 1980, 72, 5779-5780. While electric field enhancement is observed for 10-200 nM metallic particles, even greater local field enhancements are observed at sharp surface features, for example, at the tips of needle-shaped nanorods where the curvature radius is much smaller than the size of the nanoparticle. Gersten, J. I. *J. Chem. Phys.* 1980, 72, 5779-5780. This phenomenon is known as the lightning rod effect. Despite the desirable characteristics of metallic nanorods and nanowires as SERS substrates, only a few reports exist for SERS on rod- or wire-shaped nanoparticles. Tao, A.; Kim, F.; Hess, C.; Goldberger, J.; He, R.; Sun, Y.; Xia, Y, Yang, P. *Nano Lett.* 2003, 3, 1229-1323. Jeong, D. H.; Zhang, Y. X.; Moskovits, M., *J. Phys. Chem. B* 2004, 108, 12724-12728. Yao, J. L.; Pan, G. P.; Xue, K. H.; Wu, D. Y.; Ren, B.; Sun, D. M.; Tang, J.; Xu, X.; Tian, Z. Q. *Pure Appl. Chem.* 2000, 72, 221-228. Nikoobakht et al. have examined the use of unaggregated and aggregated gold nanorods as SERS substrates using pyridine and 4-aminothiophenol analytes. Nikoobakht, B. Wang, J. El-Sayed, M. A. *Chem. Phys. Lett.* 2002, 366, 17-23. Nikoobakht, B., El-Sayed, M. A., *J. Phys. Chem. A* 2003, 107, 3372-3378. For SERS on unaggregated nanorods, the excitation wavelength was 1064 nm, far removed from the nanorod absorption bands (~520 nm and 700 nm) where the EM enhancement mechanism is thought to be inoperative. Nikoobakht, B. Wang, J. El-Sayed, M. A. *Chem. Phys. Lett.* 2002, 366, 17-23. Despite the off-resonance condition, appreciable SERS intensity was observed with surface enhancement factors (EF) of 104 for pyridine. The authors attributed the enhancement to a chemical (CHEM) enhancement mechanism of strongly adsorbed pyridine on the Au{110} surface of these nanorods. However, no reports have been made for SERS on nanorods where the Raman excitation occurs at a wavelength that overlaps with nanorod plasmon resonance, a condition where the EM enhancement mechanism should be operative.

Large enhancement factors and even single molecule SERS have been reported for molecules at junctions between aggregated nanoparticles. Jiang, J.; Bosnick, K.; Maillard, M.; Brus, L., *J. Phys. Chem. B* 2003, 107, 9964-9972. Xu, H. X.; Bjerneld, E. J.; Kall, M.; Borjesson, L. *Phys. Rev. Lett.* 1999, 83, 4357-4360. Michaels, A. M.; Jiang, J.; Brus, L., *J. Phys. Chem. B* 2000, 104, 11965-11971. This is a result of localized surface plasmon (LSP) coupling between nanoparticles and enhanced electromagnetic field intensity localized at nanoparticle junctions. Michaels, A. M.; Jiang, J.; Brus, L., *J. Phys. Chem. B* 2000, 104, 11965-11971. Vidal, F. J. G-.; Pendry, J. B. *Phys. Rev. Lett.* 1996, 77, 1163-1166. Wang, D.-S.; Kerker, M. *Phys. Rev. B* 1981, 24, 1777-1790. Markel, V. A.; Shalaev, V. M.; Zhang, P.; Huynh, W.; Tay, L.; Haslett, T. L.; Moskovits, M. *Phys. Rev. B* 1999, 59, 10903-10909. Su, K.-H.; Wei, Q.-H.; Zhang, X.; Mock, J. J.; Smith, D. R.; Schultz, S, *Nano Lett.* 2003, 3, 1087-1090. Atay, T.; Song, J.-H.; Murmikko, A. V. *Nano Lett.* 2004, 4, 1627-1731. Fromm, D. P.; Sundaramurthy, A.; Schuck, P. J.; Kino, G.; Moemer, W. E. *Nano Lett.* 2004, 4, 957-961. This LSP coupling between aggregated gold nanorods is believed to contribute to SERS enhancement observed by El-Sayed and coworkers. Nikoobakht, B., El-Sayed, M. A., *J. Phys. Chem. A* 2003, 107, 3372-3378. It is important to note, that although it is difficult to estimate enhancement factors for aggregated nanoparticles, the authors stated that SERS enhancements were always greater for aggregated gold nanorods than for aggregated spherical nanoparticles. Nikoobakht, B., El-Sayed, M. A., *J. Phys. Chem. A* 2003, 107, 3372-3378. Similarly, LSP coupling between colloidal nanoparticles and the surface of planar substrates, referred to as surface plasmon polariton (SPP), has also been well documented and has been reported for surface plasmon resonance (SPR) spectroscopy measurements. Shchegrov, A. V.; Novikov, I. V.; Maradudin, A. A. *Phys. Rev. Lett.* 1997, 78, 4269-4272. Holland, W. R.; Hall, D. G., *Phys. Rev. B* 1983, 27, 7765-7768. Kume, T.; Nakagawa, N.; Yamamoto, K., *Solid State Commun.* 1995, 93, 171-175. Lyon, L. A.; Musick, M. D.; Natan, M., *J. Anal Chem.* 1998, 70, 5177-5183. Lyon, L. A.; Pena, D. J.; Natan, M. J., *J. Phys. Chem. B* 1999, 103, 5826-5831. Hutter, E.; Cha, S.; Liu, J-F.; Park, J.; Yi, J.; Fendler, J. H.; Roy, D., *J. Phys. Chem. B* 2001, 105, 8-12. A 20-fold increase in signal is observed for biological sandwich assays where analytes are between nanoparticles and a planar surface, and LSP-SPP coupling occurs. LSP-SPP coupling has also been observed qualitatively by Zheng et al. between silver nanoparticles and surface plasmons of planar silver substrates. Zheng, J.; Zhou, Y.; Li, X.; Ji, Y.; Lu, T.; Gu, R *Langmuir* 2003, 19, 632-636. They observed greater SERS intensity for 4-aminothiophenol (4-ATP) self-assembled monolayers (SAMs) on silver when colloidal silver nanoparticles are adsorbed to the SAM than for the 4-ATP SAM of polished and electrochemically roughened silver. Zheng, J.; Zhou, Y.; Li, X.; Ji, Y.; Lu, T.; Gu, R *Langmuir* 2003, 19, 632-636.

A significant challenge in SERS on colloidal nanoparticle substrates is determining the number of analyte molecules sampled during the experiment. It is essential to calculate not only the number of nanoparticles in solution, but also the surface coverage of analyte molecules adsorbed to these nanoparticles. This is especially difficult for nanoparticles that are synthesized using strongly adsorbed capping agents including cetyltrimethylammonium bromide (CTAB), which may or may not be displaced by the analyte of interest. Nikoobakht, B. Wang, J. El-Sayed, M. A. *Chem. Phys. Lett.* 2002, 366, 17-23. Nikoobakht, B.; El-Sayed, M. A. *Langmuir* 2001, 17, 6368-6374. In most reports, monolayer surface coverage on the nanocrystals is assumed, but if incorrect could lead to errors in calculations of EF values. For SERS on self-assembled monolayers (SAMs) on planar substrates, this problem is avoided altogether because there are no capping agents on these substrates and the number of molecules sampled is well known. Ulman, A. *Chem. Rev.* 1996, 96, 1533-1554. However, the tunability of the optical properties of planar SERS substrates is more difficult than solution-prepared colloids.

Previous research has done some work on high yield synthesis of gold nanorods and a plethora of other shapes of nanocrystals. Jana, N. R.; Gearheart, L. Murphy, C., *J. Adv. Mater.* 2001, 137, 1389-1393. Jana, N. R.; Gearheart, L. Murphy, C. J., *J. Phys. Chem. B* 2001, 105, 4065-4067. Sau, T. K.; Murphy, C. J. *Langmuir* 2004, 20, 6414-6420. Sau, T. K.; Murphy, C. J., *J. Am. Chem. Soc.* 2004, 126, 8648-8649. Additionally, the immobilization of CTAB-protected gold nanorods on carboxylate-terminated SAMs has been studied. Gole, A.; Orendorff, C. J.; Murphy, C. J. *Langmuir* 2004, 20, 7117-7122. In the present invention, CTAB-capped nanoparticles of various shapes are immobilized on 4-mercaptobenzoic acid (4-MBA) monolayers. SERS spectra of 4-MBA are acquired to determine the effect of immobilizing gold nanoparticles on SERS of 4-MBA SAMS on gold and to determine whether the nanoparticle shapes, specifically their optical properties and surface structure, influence SERS of 4-MBA SAMs.

Therefore, there remains a need for methods and compositions that generally improve the synthesis of gold nanorods by decreasing the amount of wasted gold and for a synthesis of gold nanorods with optical absorption of wavelength (Plasmon resonance) greater than 1000 nm which is not possible using the traditional synthesis techniques for gold nanorods in such high yield. This is achieved for the present invention using a new reducing agent, hydroquinone, which allows for a greater yield of nanorods than previously possible, as well as increased Plasmon resonance wavelength.

Near infrared (NIR) nanorods also have tremendous advantages for in-vivo imaging applications. The near infrared wavelengths are highly transmissive to skin and tissues. Consequently, deeper penetration is possible with NIR nanorods. Current methods of in-vivo imaging beyond SERS include photothermal imaging, optical coherence tomography, two photon fluorescence, diffuse reflectance, and photoacoustic imaging.

SUMMARY OF THE INVENTION

This invention prepares shaped gold nanoparticles by replacing the conventionally used ascorbic acid reducing agent with hydroquinone as the reducing agent for hydrogen tetrachloroaurate ($HAuCl_4$), and as well by altering the relative amounts of silver nitrate and gold seed used, with the resulting gold nanorods larger in size (approximately 15 nm width by 100 nm length) produced. Nanorods are produced with a very high shape yield, with almost no other shapes present and as well as very high yield in terms of total gold converted to gold nanorods with greater than 95% of gold salt converted in most cases. Resulting nanorods have unique optical properties in that they can absorb light at greater than 1000 nm wavelength which is not possible by using traditional procedures and ascorbic acid reducing agent.

BRIEF DESCRIPTION OF THE DRAWINGS

The accompanying figures, which are incorporated in and constitute a part of this specification, illustrate several embodiments and together with the description serve to explain the principles of the invention.

DETAILED DESCRIPTION OF THE PREFERRED EMBODIMENTS

The present invention may be understood more readily by reference to the following detailed description of aspects of the invention and the Examples included therein and to the Figures and their previous and following description.

Before the present compounds, compositions, articles, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular embodiments only and is not intended to be limiting.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein may be different from the actual publication dates, which may need to be independently confirmed.

As used in the specification and the appended claims, the singular forms "a," "an" and "the" include plural references, unless the context clearly dictates otherwise. Thus, for example, reference to "a component," "a polymer," or "a particle" includes mixtures of two or more such components, polymers, or particles, and the like.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that throughout the application, data is provided in a number of different formats and that this data represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— units in the polyester, regardless of whether ethylene glycol was used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

As used herein, the terms "optional" or "optionally" means that the subsequently described event or circumstance may or may not occur, and that the description includes instances where said event or circumstance occurs and instances where it does not.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Shaped Nanoparticles

There are currently two main methods of producing nanorods with a plasmon of greater than 1000 nm. One is by using a mixed surfactant system of CTAB and BDAC instead of just CTAB in the regular synthesis procedure. However, this procedure is less reproducible, has a much worse shape yield (other shapes besides rods are formed) and the total gold conversion is also limited as in the regular procedure to ~30 percent. Similarly, it is possible to use a different procedure where no AgNO$_3$ is used which produces a nanorod with a different crystal structure. However, this procedure produces only a very small amount of rods compared to other shapes (about 5 percent) and it is very difficult to isolate pure nanorods from this procedure in any amount. Through this invention, one can produce large amounts of highly pure nanorods with very little waste of gold.

Various aspect ratio Ag and Au nanorods, Ag nanowires, and cubic Cu$_2$O particles in aqueous solution have been produced. Jana, N. R.; Gearheart, L.; Murphy, C. J., *J. Phys. Chem. B* 2001, 105, 4065-4067. Jana, N. R.; Gearheart, L.; Murphy, C., *J. Adv. Mater.* 2001, 13, 1389-1393. Jana, N. R.; Gearheart, L.; Murphy, C., *J. Chem. Commun.* 2001, 617-618. Gao, J.; Bender, C. M.; Murphy, C. J. *Langmuir* 2003, 19, 9065-9070. Gou, L.; Murphy, C. J. *Nano Lett.* 2003, 3, 231-234. Based upon electron diffraction analysis and high-resolution transmission electron microscopy studies, the mechanism for the evolution of cylindrical rod shapes in aqueous solution by the seeded growth method was investigated. Johnson, C. J.; Dujardin, E.; Davis, S. A.; Murphy, C. J.; Mann, S. J. *Mater. Chem.* 2002, 12, 1765-1770. Alivisatos et al., Peng et al., and Cheon et al. utilized high-temperature solution methods to obtain a score of interesting shapes for semiconductor systems. Peng, X.; Manna, L.; Yang, W. D.; Wickham, J.; Scher, E.; Kadavanich, A.; Alivisatos, A. P. *Nature* 2000, 404, 59-61. Manna, L.; Scher, E. C.; Alivisatos, A. P., *J. Am. Chem. Soc.* 2000, 122, 12700-12706. Manna, L.; Milliron, D. J.; Meisel, A.; Scher, E. C.; Alivisatos, A. P. *Nat. Mater.* 2003, 2, 382-385. Peng, Z. A.; Peng, X., *J. Am. Chem. Soc.* 2002, 124, 3343-3353. Peng, X. Adv. Mater. 2003, 15, 459-463. Lee, S.-M.; Jun, Y.-W.; Cho, S.-N.; Cheon, J. *J. Am. Chem. Soc.* 2002, 124, 11244-11245. Au particles with hexagonal (icosahedral) and pentagonal (decahedral) profiles have been synthesized by vapor deposition methods. Yacaman, M. J.; Ascencio, J. A.; Liu, H. B.; Gardea-Torresdey, J. *J Vac. Sci. Technol. B* 2001, 19, 1091-1103. Yang, C. Y.; Heinemann, K.; Yacaman, M. J.; Poppa, H. *Thin Solid Films* 1979, 58, 163-168. Renou, A.; Gillet, M. *Surf Sci.* 1981, 106, 27-34. Recently, Chen et al. and Hao et al. reported the synthesis of a mixture of branched gold Au nanocrystals by using two different colloid chemical synthetic protocols. Chen, S.; Wang, Z. L.; Ballato, J.; Foulger, S. H.; Carroll, D. L. *J. Am. Chem. Soc.* 2003, 125, 16186-16187. Hao, E.; Bailey, R. C.; Schatz, G. C.; Hupp, J. T.; Li, S, *Nano Lett.* 2004, 4, 327-330.

Preparation Methods

In one aspect, the methods of the invention involve the preparation of Au seed particles and the subsequent addition of an appropriate quantity of the Au seed solution to the aqueous growth solutions containing desired quantities of cetyltrimethylammonium bromide (CTAB), HAuCl$_4$, ascorbic acid (AA), and, optionally, a small quantity of AgNO$_3$.

Figure 1:
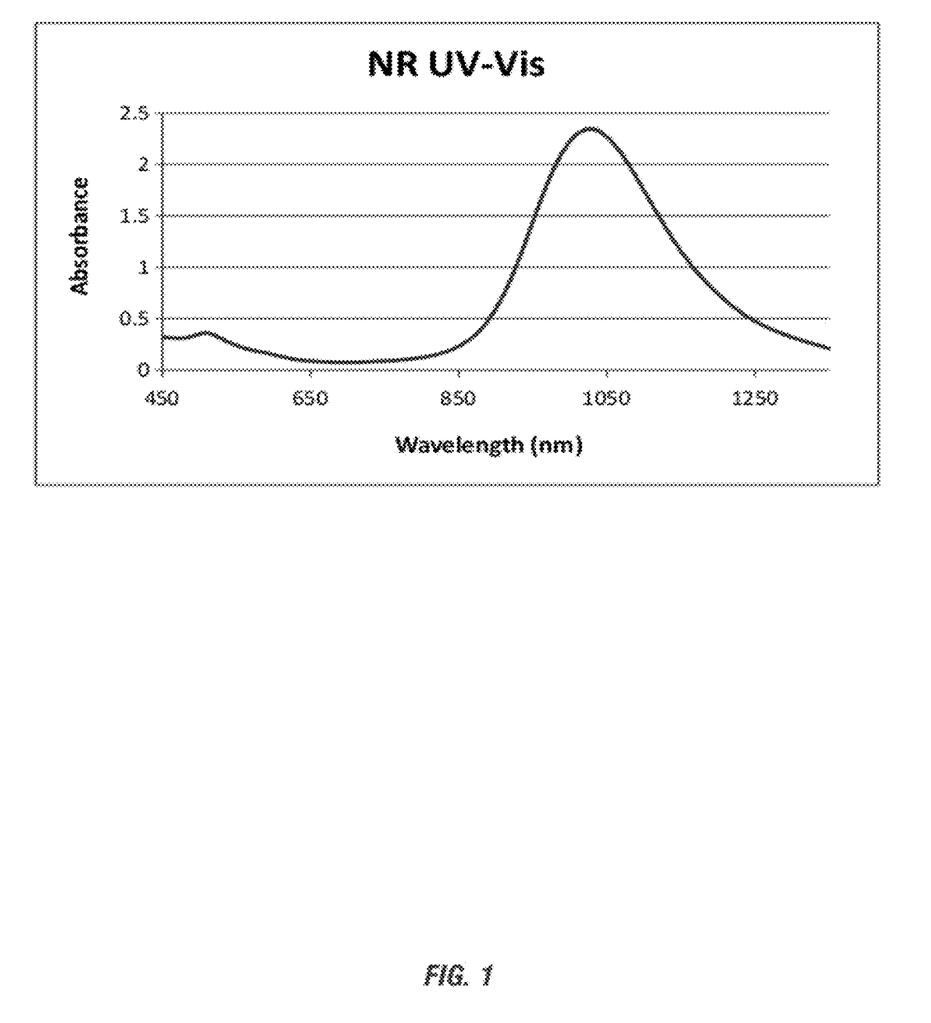
FIG. 1 is an optical absorption spectra of typical solutions of gold nanorods that were grown with hydroquinone in accordance with the method of the present invention and diluted three times.
Figure 2:
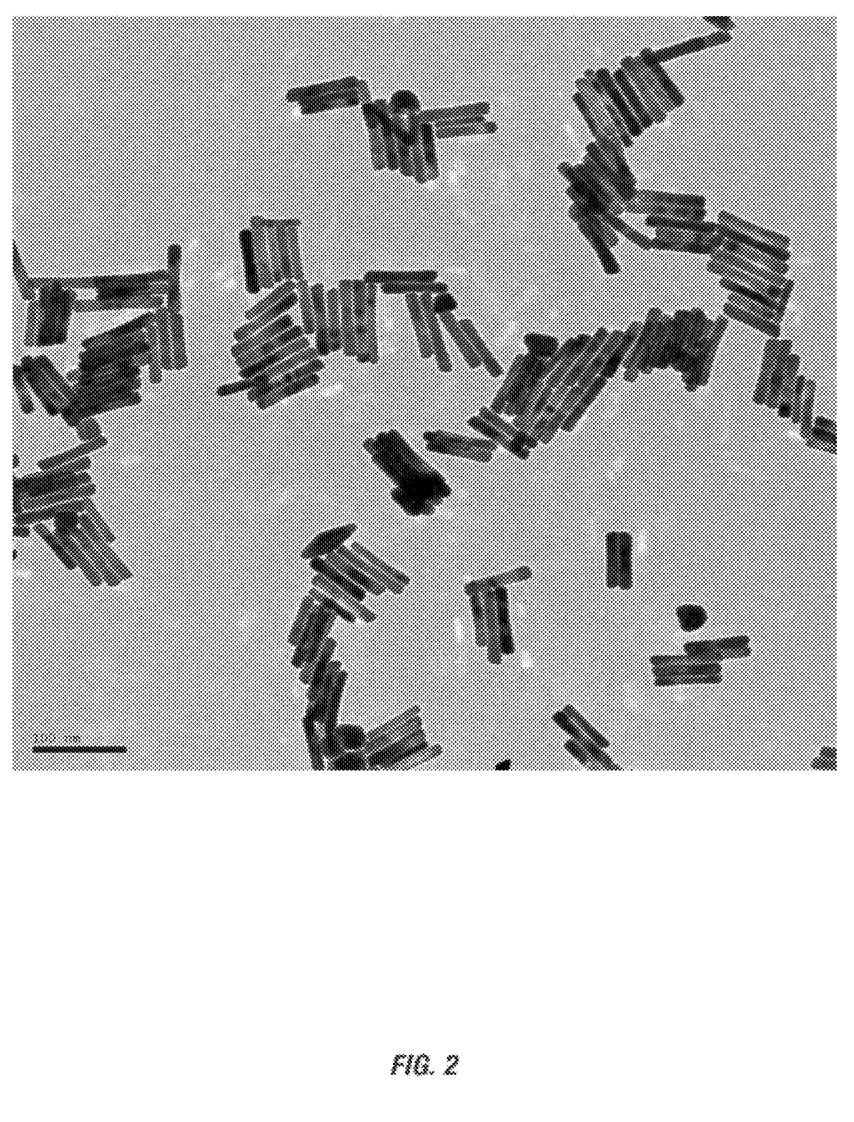
FIG. 2 shows representative transmission electron microscopy (TEM) images of a sample of FIG. 1 nanorods.
Figure 3:
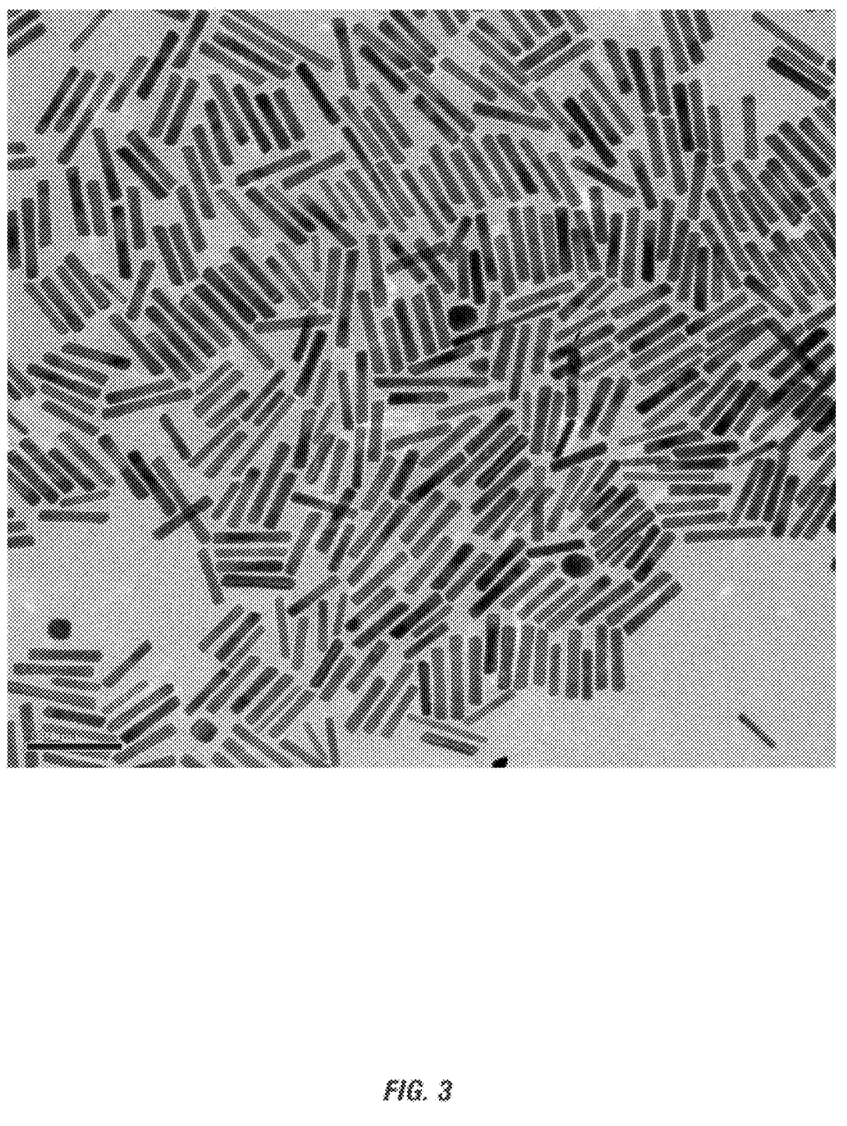
FIG. 3 shows representative TEM images of a sample of FIG. 1 nanorods.
Figure 4:
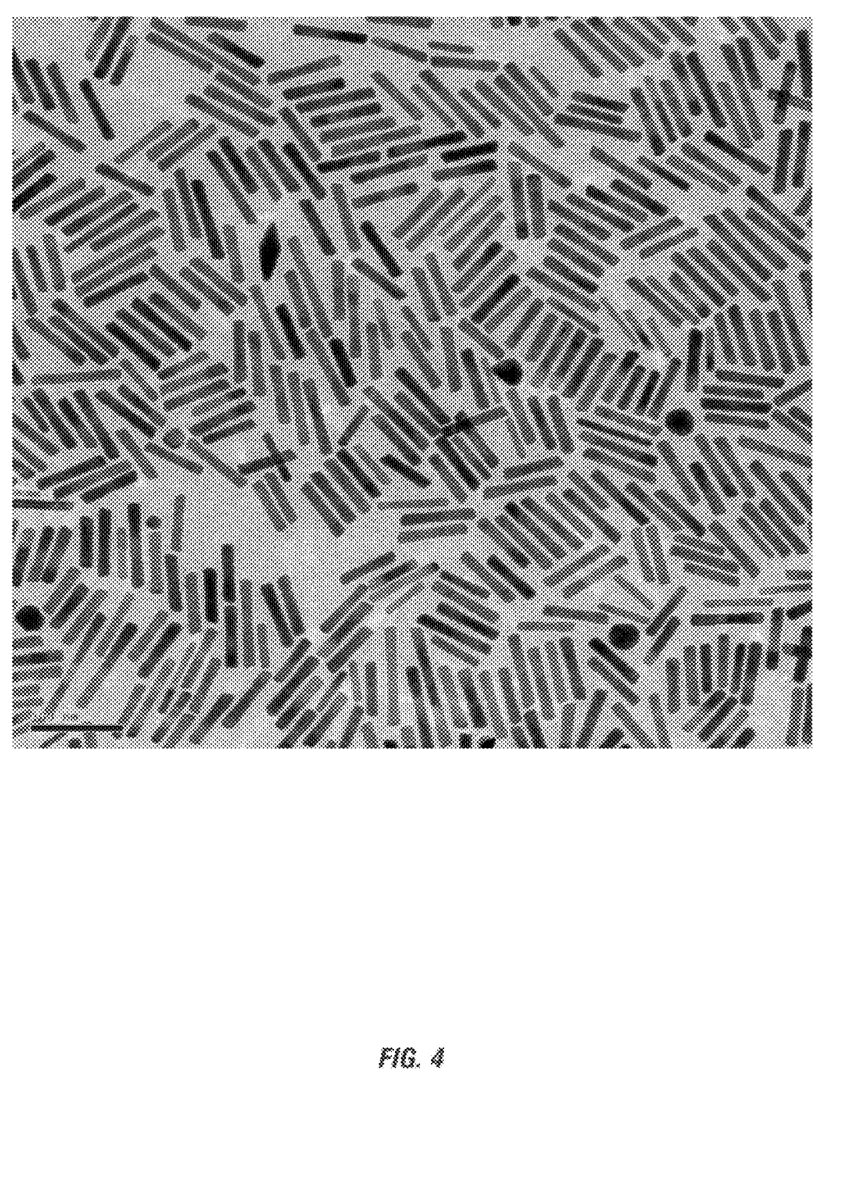
FIG. 4 shows representative TEM images of a sample of FIG. 1 nanorods.
Figure 5:
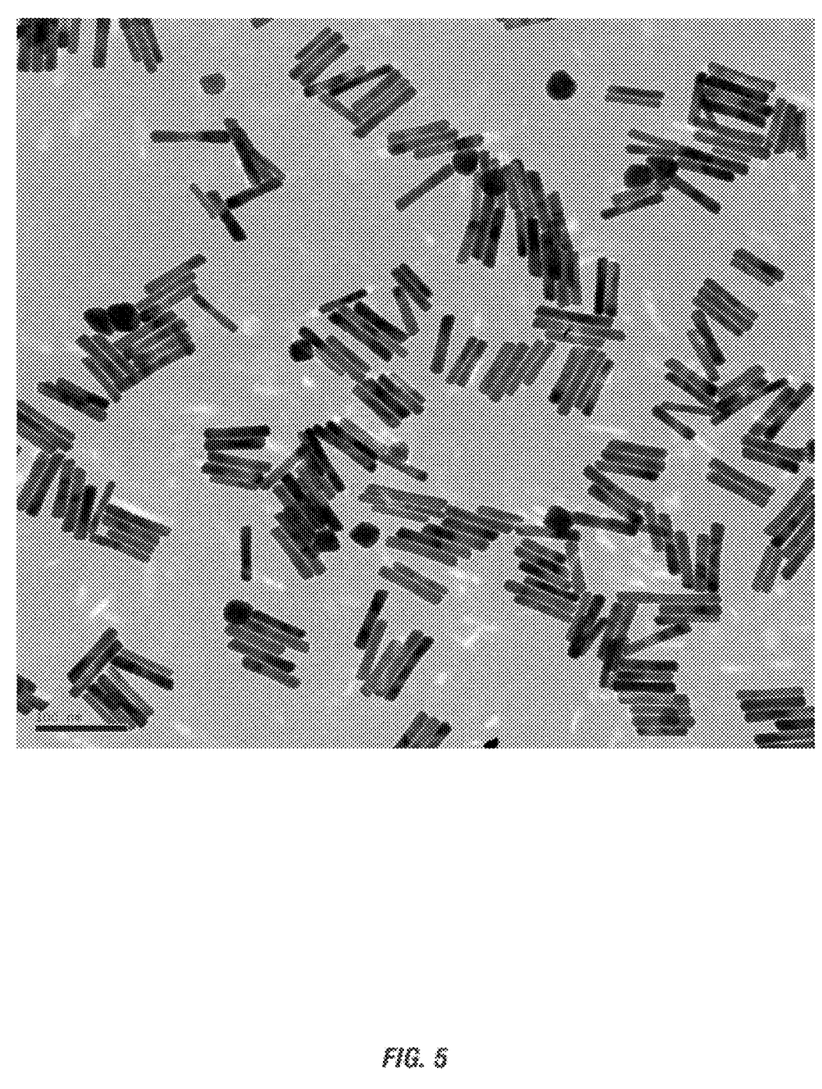
FIG. 5 shows representative TEM images of a sample of FIG. 1 nanorods.

Gold Nanorods are typically synthesized by the reduction of gold salts (gold (III) chloride) dissolved in water in the presence of the surfactant cetyltrimethylammonium bromide (CTAB) using the typical reducing agent ascorbic acid in the presence of silver ions (silver nitrate) and preformed gold "seed" nanoparticles. The seed nanoparticles were synthesized in the typical fashion by addition of a sodium borohydride (NaBH$_4$) water solution to an aqueous solution of HAuCl$_4$ (gold chloride) and CTAB, resulting in a yellow-brown solution. Separately, a growth solution was prepared by dissolving HAuCl$_4$, silver nitrate (AgNO$_3$), and CTAB in water and adding to that a solution of hydroquinone until the solution became colorless. Then, an amount of the seed solution was added to the growth solution and the reaction was allowed to sit overnight, producing a dark brown colored solution due to the presence of gold nanorods of size 10-25 nm width by 70-300 nm length with an optical absorbance (due to the surface Plasmon resonance) at greater than 1000 nm wavelength. A representative UV-Visible absorbance spectrum as well as transmission electronic micrographs are shown in FIGS. 1-5.

This invention generally improves on the synthesis of gold nanorods by greatly decreasing the amount of gold that is wasted during the procedure from 70 percent or more from the standard procedure down to 5% or less for this procedure with a similar one step synthesis available within a day. Considering the cost of gold, this is a significant improvement. Gold nanorods in general have garnered interest for their use in biological applications such as optical contrast agents as well as their use in photothermal cancer therapy. They may also be useful for other optical and electronic applications. These applications depend on their efficient absorbance and scattering of light at different wavelengths. Generally produced by lasers at different wavelengths, especially those in the near-infra red (~750 nm-1300 nm). One common laser currently being used is the Nd:YAG laser at 1064 nm but, until now, it was difficult to produce gold nanorods that have a matching absorption in this region. With this invention, nanorods can be synthesized that match this requirement and can thus be used in any applications requiring this common laser, including photothermal cancer therapy.

With published procedures, it is possible to synthesize relatively short gold nanorods (up to a size of ~15 nm width by ~45 nm length) with an optical absorbance of wavelength up to ~900 nm. The yield of this procedure is theoretically at most 30 percent gold salt converted into metallic gold nanorods, with 70 percent of the gold going to waste although typically it is even smaller. With this invention, a new reducing agent is used instead of ascorbic acid: hydroquinone. By using hydroquinone as the reducing agent as well as by altering the relative amounts of silver nitrate and gold seed used, gold nanorods with larger size (~25 nm width by ~300 nm length) can be produced. These nanorods are produced with a very high shape yield (almost no other shapes present besides rods) as well as a very high yield in terms of total gold salt converted to gold nanorods with greater than 95% of gold salt converted. The synthesis has been scaled up to several liters of solution with no changes in the result. Due to their high aspect ratio, the nanorods have unique optical properties in that they can absorb light at greater than 1000 nm wavelength, which is not possible by using the traditional procedure (Reference 1, first half of paper) although there are a couple of procedures reported for the synthesis of such longer, higher aspect ratio rods (Reference 1, second half, and Reference 2) which will be described later.

In general, changing the reducing agent is not a trivial change in the procedure in that the synthesis of nanorods is very sensitive to any small changes in the reaction conditions. For example, a simple change from ascorbic acid to hydroquinone in the same molar amounts as the regular procedure leads to no rod growth. In fact, basically all procedures for gold nanorod growth in CTAB solutions use only ascorbic acid. Furthermore, the change to hydroquinone allows the synthesis to be much more robust. For the regular rod synthesis, a difference in just a couple drops of ascorbic acid can lead to a failure of the synthesis, whereas this procedure is much less sensitive to such small changes.

It may be possible to use different ratios of gold/silver/seed to produce nanorods of different sizes and Plasmon resonances, though these variables have been fairly optimized to find conditions that maximize the Plasmon resonance wavelength. It may be possible to optimize the technique to increase the monodispersity of the nanorods produced.

The synthesis of nanorods have been carried out on solution volumes of 10 mL (typical bench scale) up to 2 L and appears to be very scalable.

Cetyltrialkylammonium Halide-Capped Nanoparticles

In one aspect, the invention relates to a cetyltrialkylammonium halide-capped nanoparticle. That is, the gold nanoparticle has at least one cetyltrialkylammonium halide residue associated with the surface of the nanoparticle. In a further aspect, the nanoparticle is a cetyltrialkylammonium halide-capped gold nanoparticle. In a further aspect, the invention relates to a cetyltrimethylammonium bromide-capped gold nanoparticle. In one aspect, the invention relates to a composition comprising nanoparticulate gold and a cetyltrimethylammonium bromide residue. In various aspects, the composition has a shape comprising a cube, a block, a tetrapod, a sphere, a rod, a star, or a dogbone. In a further aspect, the shape comprises a cube, a block, a tetrapod, a rod with an aspect ratio of at least about 3.2, or a dogbone.

Enhancing Raman Signals

The methods and compositions of the invention can be used to enhance Raman signals. In one aspect, the method comprises the steps of providing a sample comprising a metal surface, an analyte adhered to the surface, and a metallic nanoparticle coupled to the surface, wherein the nanoparticle has a plasmon resonance band; exposing the sample to incident energy of an excitation wavelength that overlaps with the metallic nanoparticle plasmon resonance band; and detecting the Raman signal of the analyte.

By "coupled," it is meant that the nanoparticle is in relatively close proximity to the surface and the resulting combination can operate to enhance the vibrational spectral intensity of an analyte adhered to the surface. In one aspect, the nanoparticle and the surface can form a "sandwich" with the analyte, resulting in enhanced vibrational spectral intensity of the analyte.

By "adhered," it is meant that the analyte is associated with the surface. In one aspect, the analyte is chemically bonded to the surface by, for example, at least one covalent bond, ionic bond, coordination bond, or hydrogen bond. In a further aspect, the analyte is attracted to the surface by, for example, hydrophobic interactions or hydrophilic interactions. In a further aspect, the analyte is reversibly associated with the surface.

In a further aspect, the method comprises the steps of providing a sample comprising a metal surface, a functionalized self-assembled monolayer adhered to the surface, wherein the self-assembled monolayer comprises an analyte, and a cetyltrimethylammonium bromide-capped metallic nanoparticle coupled to the surface; exposing the sample to incident energy of an excitation wavelength; and detecting the Raman signal of the analyte. In one aspect, the nanoparticle has a plasmon resonance band and the excitation wavelength overlaps with the metallic nanoparticle plasmon resonance band. In a further aspect, the surface comprises at least one of gold, silver, copper, or silicon or a mixture or an alloy thereof. In a further aspect, the analyte comprises a thiol moiety. In a further aspect, the analyte comprises a carboxylic acid moiety. In a further aspect, the nanoparticle comprises at least one of gold, silver, or copper or a mixture or an alloy thereof.

Typically, the nanoparticle produced by the methods of the invention has a shape. In one aspect, the shape comprises a cube, a block, a tetrapod, a sphere, a rod, a star, or a dogbone. In a further aspect, the shape comprises a cube and the plasmon resonance band comprises a wavelength maximum of about 540 nm. In a further aspect, the shape comprises a sphere and the plasmon resonance band comprises a wavelength maximum of about 52 0 nm. In a further aspect, the shape comprises a rod with an aspect ratio of from about 3.2 to about 16 and the plasmon resonance band comprises a longitudinal wavelength maximum of from about 685 nm to about 1200 nm and a transverse maximum of about 520 nm. In a further aspect, the shape comprises a rod with an aspect ratio of greater than about 16 and the plasmon resonance band comprises a wavelength maximum of greater than about 1200 nm. In a further aspect, the shape comprises a tetrapod or a dogbone and the plasmon resonance band comprises a wavelength of about 633 nm.

In one aspect, the invention relates to a method for enhancing a Raman signal comprising the steps of providing a sample comprising a gold surface, a functionalized self-assembled monolayer adhered to the surface, wherein the self-assembled monolayer comprises an analyte, and a cetyltrimethylammonium bromide-capped metallic nanoparticle coupled to the surface; exposing the sample to incident energy of an excitation wavelength that overlaps with the metallic nanoparticle plasmon resonance band; and detecting the Raman signal of the analyte, wherein the Raman signal has an enhancement factor of from about $10^7$ to about $10^9$ relative to the analyte in solution.

Analyte

Those skilled in the art will recognize that there is a great deal of latitude in the composition of an analyte that yields a distinct Raman spectrum. For example, in some aspects, the analyte is a molecule. In other aspects, the analyte is not a molecule: it can be a positively or negatively charged ion (e.g., $Na^+$ or $CN^-$). If the analyte is a molecule, it can be neutral, positively charged, negatively charged, or amphoteric. The analyte can be a solid, liquid or gas. Non-molecular species such as metals, oxides, sulfides, etc. can serve as the Raman-active species. For example, a film of $SiO_2$ on Au exhibits a unique and identifiable Raman spectrum. Any species or collection of species that gives rise to a unique Raman spectrum, whether solid, liquid, gas, or a combination thereof, can serve as the analyte. Examples easily number in the many millions and include but are not limited to Hg, dimethylformamide, HCl, $H_2O$, $CN^-$, polypyrrole, hemoglobin, oligonucleotides, charcoal, carbon, sulfur, rust, polyacrylamide, citric acid, and diamond. In the case of diamond, the unique phonon mode of the particle can be used. For hemoglobin, only the porphyrin prosthetic group exhibits significant Raman activity; thus, complex substances can be used as the analyte if only part of the molecular or atomic complexity is present in the Raman spectrum.

The analyte can also be a polymer to which multiple Raman-active moieties are attached. In one aspect, the polymer can have different attached moieties yielding different Raman spectra. The polymer backbone does not necessarily itself contribute to the acquired Raman spectrum. In one aspect, the polymer can be a linear chain containing amine or ammonium groups to which Raman-active entities are attached. In a further aspect, the polymer can be a dendrimer, a branched polymer with a tightly controlled tree-like structure, with each branch terminating in a Raman-active species. A suitable dendrimer structure can have four generations of branches terminating in approximately 45 Raman-active entities.

Typically, the analyte can be any analyte known to those of skill in the art for analysis by Raman spectroscopy. In one aspect, the analyte comprises a thiol moiety. In a further aspect, the analyte comprises a carboxylic acid moiety. In a yet further aspect, the analyte comprises 4-mercaptobenzoic acid (4-MBA) or a derivative or salt thereof. In a still further aspect, the analyte comprises a portion of a functionalized self-assembled monolayer. That is, in one aspect, the analyte can be used to prepare a self-assembled monolayer on the surface.

Surface

Typically, the surface can be any surface known to those of skill in the art for use in Raman spectroscopy. In a further aspect, the surface comprises at least one of gold, silver, copper, or silicon or a mixture or an alloy thereof. In a yet further aspect, the surface comprises gold.

While, in one aspect, the analyte can comprise a portion of a functionalized self-assembled monolayer, in a further aspect, the surface can be functionalized with, for example, a self-assembled monolayer. In such an aspect, the self-assembled monolayer can be selected to have an affinity for an analyte, thereby providing an alternate mechanism for adhering an analyte to the surface.

Nanoparticle

Typically, the nanoparticle can be any nanoparticle known to those of skill in the art. In one aspect, the nanoparticles are the cetyltrialkylammonium halide-capped nanoparticles. That is, the nanoparticle has at least one cetyltrialkylammonium halide residue associated with the surface of the nanoparticle. In a further aspect, the nanoparticle comprises a cetyltrialkylammonium bromide-capped metallic nanoparticle. In a further aspect, the invention relates to a cetyltrimethylammonium bromide-capped gold nanoparticle.

In one aspect, the nanoparticle comprises at least one of gold, silver, or copper or a mixture or an alloy thereof. In a further aspect, the nanoparticle comprises gold.

In one aspect, the nanoparticle has a shape comprising a cube, a block, a tetrapod, a sphere, a rod, a star, or a dogbone. In a further aspect, the shape comprises a cube and the plasmon resonance band comprises a wavelength maximum of about 540 nm. In a further aspect, the shape comprises a sphere and the plasmon resonance band comprises a wavelength maximum of about 520 nm. In a further aspect, the shape comprises a rod with an aspect ratio of from about 3.2 to about 16 and the plasmon resonance band comprises a longitudinal wavelength maximum of from about 685 nm to about 1200 nm and a transverse wavelength maximum of about 520 nm. In a further aspect, the shape comprises a rod with an aspect ratio of greater than about 16 and the plasmon resonance band comprises a wavelength maximum of greater than about 1200 nm. In a further aspect, the shape comprising a tetrapod or a dogbone and the plasmon resonance band comprises a wavelength of about 633 nm.

In certain aspects of the invention, the nanoparticles can be random aggregates of nanoparticles (colloidal nanoparticles). In other embodiments of the invention, nanoparticles can be cross-linked to produce particular aggregates of nanoparticles, such as dimers, trimers, tetramers or other aggregates. Certain alternative aspects of the invention can use heterogeneous mixtures of aggregates of different size, while other alternative aspects can use homogenous populations of nanoparticle aggregates. In certain aspects of the invention, aggregates containing a selected number of nanoparticles (dimers, trimers, etc.) can be enriched or purified by known techniques, such as ultracentrifugation in sucrose gradient solutions.

Excitation Energy

Typically, any source of excitation energy known to those of skill in the art can be used in connection with the invention. Suitable excitation sources include a 514.5 nm line argon-ion laser 370 from SpectraPhysics, Model 166, and a 647.1 nm line of a krypton-ion laser 370 (Innova 70, Coherent), a nitrogen laser 370 (Laser Science Inc.) at 337 nm and a helium-cadmium laser 370 (Liconox) at 325 nm (U.S. Pat. No. 6,174,677), a light emitting diode, an Nd:YLF laser 370, and/or various ions lasers 370 and/or dye lasers 370. The excitation beam 390 can be spectrally purified with a bandpass filter (Corion) and can be focused on the Raman active substrate 240, 340 using a 6× objective lens (Newport, Model L6X). The objective lens can be used to both excite the analytes and to collect the Raman signal, by using a holographic beam splitter (Kaiser Optical Systems, Inc., Model HB 647-26N18) to produce a right-angle geometry for the excitation beam 390 and the emitted Raman signal. A holographic notch filter (Kaiser Optical Systems, Inc.) can be used to reduce Rayleigh scattered radiation. Alternative Raman detectors 380 include an ISA HR-320 spectrograph equipped with a red-enhanced intensified charge-coupled device (RE-ICCD) detection system (Princeton Instruments). Other types of detectors 380 may be used, such as Fourier-transform spectrographs (based on Michaelson interferometers), charged injection devices, photodiode arrays, InGaAs detectors, electron-multiplied CCD, intensified CCD and/or phototransistor arrays.

Typically, the excitation energy is selected so as to overlap with a plasmon band of a nanoparticle of the invention. In one aspect, the excitation energy is provided as light of an excitation wavelength incident upon the surface or upon the composition or upon the analyte. In a further aspect, the incident energy is provided by a visible light wavelength laser. In a yet further aspect, the incident energy is provided by a HeNe laser.

In one aspect, the excitation comprises visible light. In a further aspect, the excitation comprises ultraviolet light. In a further aspect, the excitation comprises infrared light. In one aspect, the excitation comprises light of a wavelength of from about 400 nm to about 500 nm, from about 500 nm to about 600 nm, from about 700 nm to about 800 nm, from about 800 nm to about 900 nm, from about 900 nm to about 1000 nm, from about 1000 nm to about 1100 nm, from about 1100 nm to about 1200 nm, or of greater than about 1200 nm. In one aspect, the excitation wavelength comprises a wavelength of about 633 nm.

Enhancement Factor

In one aspect, use of the methods and compositions of the invention results in enhancement of a Raman signal. The amount of enhancement can be referred to as an enhancement factor (EF). The EF can be expressed relative to an analyte in solution or an analyte on a surface. In one aspect, the Raman signal has an enhancement factor of from about $10^7$ to about $10^9$ relative to the analyte in solution.

In a further aspect, the nanoparticle has a shape comprising a cube, a block, a tetrapod, a rod with an aspect ratio of at least about 3.2, or a dogbone and the Raman signal has an enhancement factor of from about $10^1$ to about $10^2$ relative to the analyte in a sample comprising a spherical nanoparticle.

Those skilled in the art of Raman spectroscopy are aware that the general concept of inelastic light scattering has many alternative manifestations that can be used for detection. The basic "normal" Raman scattering experiment involves detection/measurement of Stokes-shifted photons, i.e., those with a lower energy than the incident photons. Anti-Stokes photons-those with energies greater than the incident photons-are also generated in a Raman experiment. While the intensity of anti-Stokes Raman bands is typically low compared to the Stokes bands, they offer one very significant advantage: the lack of interference from fluorescence, which by definition occurs at lower energies than excitation. In embodiments in which the overall SERS intensity is sufficiently high, this may be an attractive method for detection.

For molecules whose absorption spectrum overlaps with the laser excitation wavelength, Raman experiments can be said to be in resonance; both the theory and practice of resonance Raman are well understood. SERS experiments carried out under these circumstances can also be referred to as SERRS (surface enhanced resonance Raman scattering). SERRS spectra are typically more intense than normal Raman spectra, and may provide an additional benefit. Organic molecules that possess high extinctions in the visible region of the spectrum also exhibit relatively complex molecular structures, and as such might not be optimal choices for the intermediate layer. On the other hand, coordination complexes can have reasonably high absorptivity and still possess simple structures. For example, simple homoleptic complexes of Cu (I) and Cu (II) are often intensely colored (e.g., $[Cu(NH_3)_4]^+$).

In addition to SERS and SERRS, there are a variety of other detection mechanisms contemplated by the instant invention, including but not limited to surface enhanced infrared absorption spectroscopy (SEIRA), surface enhanced hyperRaman spectroscopy (SEHRS), and its resonant analog, SEHRRS. In SEHRS and SEHRRS, two photons of frequency A generate a scattering event at a frequency of 2 A. The primary benefit of this method is the total lack of interference by fluorescence or any other background process: one can excite a particle with 800 nm light and observe photons Raman-shifted from 400 nm. In general, for a given analyte with N atoms, there are either 3N-5 or 3N-6 unique vibrations; all of these vibrations can be found in either the Raman, hyperRaman, or infrared spectrum. Indeed, in some aspects, identification can rest on a combination of optical interrogation methods, including methods that rely on inelastic scattering of photons (e.g., SERS, SERRS, SEHRS, and SEHRRS, in both Stokes and anti-Stokes modes), methods that rely on elastic scattering of photons (e.g., Raleigh scattering and hyperRaleigh scattering for particles with dimensions at least 1/10th of the excitation wavelength), and methods that rely on adsorption, e.g., SEIRA.

Compositions

Typically, various compositions of the invention can be used in connection with the methods of the invention. In one aspect, the invention relates to a composition comprising a metal surface, a functionalized self-assembled monolayer adhered to the surface, wherein the self-assembled monolayer comprises an analyte, and a cetyltrialkylammonium halide-capped metallic nanoparticle coupled to the surface. In one aspect, the surface comprises at least one of gold, silver, copper, or silicon or a mixture or an alloy thereof. In a further aspect, the nanoparticle comprises a cetyltrialkylammonium bromide-capped metallic nanoparticle. In a further aspect, the nanoparticle comprises a cetyltrimethylammonium bromide-capped metallic nanoparticle.

EXAMPLE

The following example is put forth so as to provide one of ordinary skill in the art a complete disclosure and description of the process and the nanorods made and evaluated and is intended exemplary only and not intended to be limiting on the scope of the invention.

Preparation of Shaped Nanoparticles

General Procedures

In a typical seed synthesis, a 10 mL solution of Au seeds is prepared by the reduction of $HAuCl_4 \cdot 3H_2O$ ($2.5 \times 10^{-4}$ M) by ice-cold $NaBH_4$ ($6.0 \times 10^{-4}$ M) in the presence of cetyltrimethylammonium bromide (CTAB, $7.5 \times 10^{-2}$ M). The $NaBH_4$ solution is added at a time to the solution containing CTAB and $HAuCl_4$ and the reaction mixture is then shaken (or magnetically stirred) for two minutes allowing the escape of the gas formed during the reaction. These seeds are likely four nm or smaller in diameter and are designated as seed(1).

Au seeds are produced at two other CTAB concentration conditions also, namely $9.5 \times 10^{-2}$ M and $5.0 \times 10^{-2}$ M. One can produce various shapes using these two seeds as well. However, the amounts of seed particles and AA required for a given $Au^{3+}$ ion and CTAB concentration are different for each of them.

The same is true for a seed sample produced from $1.0 \times 10^{-4}$ M $HAuCl_4$ solution. Relatively large seeds (20-30 nm in diameter) were also prepared by the reduction of the same quantity of $HAuCl_4$ ($2.5 \times 10^{-4}$ M) by hydroquinone ($4.0 \times 10^{-4}$ M) in the presence of tri-sodium citrate ($2.5 \times 10^{-4}$ M) as stabilizer and designated these seeds as seed (5). Cylindrical rod-shaped and armed Au particles were produced in high yield by using these larger seed particles. All the seeds' are used between 2 and 24 hours after their preparation.

In a typical growth reaction, the seed solution is 10 mL of 0.0005M HAuCl4 in 0.1M CTAB to which you add 0.6 mL 0.01M NaBH4. For a 500 mL growth solution, we prepare 500 mL of 0.0005M HAuCl4 solution in 0.1M CTAB. To this we add 1.1 mL of 0.1M AgNO3 for a final concentration of 0.00022M AgNO3 in the growth solution. To this we add 50 mL of 0.1M hydroquinone solution. Once the gold is reduced we add 8 mL of seed solution.

The following Certificate of Analysis shown in Table 1 is for the gold nanorods produced using the hydroquinone reduction process as described herein.

TABLE 1

| Product Family | | Concentrated Bare Gold Nanorodz | | |
|---|---|---|---|---|
| Product Number | | 30-10-950 | | |
| Lot # | | RPB093 | | |
| Appearance | | Gold | | |
| Form | | Colloid | | |
| Supernatant | | Water <100 mM CTAB | | |
| SPR Peak | nm | measured | UV/VIS | 954 |
| SPR Abs | AU | measured | UV/VIS | 100 |
| LSPR Peak | nm | measured | UV/VIS | 513 |
| LSPR Abs | AU | measured | UV/VIS | 5 |
| pH | | measured | Expt. | 4 |
| Zeta Potential | mV | measured | DLS | 36 |
| Axial Diameter | nm | measured | TEM | 11 |
| Long Diameter | nm | measured | TEM | 63 |
| Aspect Ratio | | calc | | 5.6 |
| Concentration | nps/mL | calc | | 4.2E+13 |
| Concentration | mg/mL | calc | | 3.500 |

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for preparing a cetyltrimethylammonium bromide-capped gold nanoparticle comprising the steps of:
   a. providing a seed solution comprising a gold nanoparticle;
   b. providing an aqueous growth solution comprising:
      i. cetyltrimethylammonium bromide, ii. hydrogen tetrachloroaurate, and
iii. hydroquinone; and
c. adding a quantity of the seed solution to the aqueous growth solution, thereby producing the cetyltrimethylammonium bromide-capped gold nanoparticle.

2. The method of claim 1, wherein the cetyltrimethylammonium bromide-capped gold nanoparticle has a shape comprising a cube, a block, a tetrapod, a sphere, a rod, a star, or a dogbone.

3. The method of claim 1, wherein the cetyltrimethyl ammonium bromide gold nanoparticle has a shape comprising a cube, a block, a tetrapod, a rod with an aspect ratio of at least about 3.2, or a dogbone.

4. The method of claim 1, wherein the providing a seed solution step comprises a step of reducing hydrogen tetrachloroaurate with ascorbic acid in the presence of cetyltrimethylammonium bromide, thereby producing seeds of less than about 4 nm.

5. The method of claim 1, wherein the providing a seed solution step comprises a step of reducing hydrogen tetrachloroaurate with sodium borohydride in the presence of trisodium citrate, thereby producing seeds of from about 20 nm to about 30 nm.

6. The method of claim 1, wherein the aqueous growth solution further comprises silver nitrate.

7. The method of claim 1, wherein the cetyltrimethyl ammonium bromide gold nanoparticle has an optical absorbance wavelength of at least 850 nm.

8. The method of claim 1, wherein the cetyltrimethyl ammonium bromide gold nanoparticle has a width of about 7 nm to about 40 nm.

9. The method of claim 1, wherein the cetyltrimethyl ammonium bromide gold nanoparticle has a length of about 50 nm to about 300 nm.

* * * * *